US010724422B2

(12) United States Patent
Hutchins (10) Patent No.: US 10,724,422 B2
(45) Date of Patent: Jul. 28, 2020

(54) CONTROLLER FOR A MOTOR VEHICLE COOLING SYSTEM AND METHOD

(71) Applicant: JAGUAR LAND ROVER LIMITED, Warwickshire (GB)

(72) Inventor: William Hutchins, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/556,309

(22) PCT Filed: Mar. 9, 2016

(86) PCT No.: PCT/EP2016/054984
§ 371 (c)(1),
(2) Date: Sep. 7, 2017

(87) PCT Pub. No.: WO2016/142406
PCT Pub. Date: Sep. 15, 2016

(65) Prior Publication Data
US 2018/0073421 A1  Mar. 15, 2018

(30) Foreign Application Priority Data
Mar. 10, 2015 (GB) .................................. 1504053.8

(51) Int. Cl.
*F01P 7/16* (2006.01)
*G05D 23/13* (2006.01)
*F01P 11/08* (2006.01)

(52) U.S. Cl.
CPC ............. *F01P 7/167* (2013.01); *F01P 7/16* (2013.01); *F01P 11/08* (2013.01); *G05D 23/134* (2013.01);
(Continued)

(58) Field of Classification Search
CPC .... F01P 7/167; F01P 7/16; F01P 11/08; F01P 2025/13; F01P 2025/32; F01P 2025/40;
(Continued)

(56) References Cited

U.S. PATENT DOCUMENTS 4,875,437 A   10/1989   Cook et al.
5,477,816 A   12/1995   Ranzinger et al.
(Continued)

FOREIGN PATENT DOCUMENTS

DE   4409547 A1   1/1995
EP   0640753 A1   3/1995
(Continued)

OTHER PUBLICATIONS

International Search Report and Written Opinion of the International Searching Authority for International application No. PCT/EP2016/054984 dated Jun. 13, 2016.
(Continued)

*Primary Examiner* — Joseph J Dallo
*Assistant Examiner* — Yi-Kai Wang
(74) *Attorney, Agent, or Firm* — Carlson, Gaskey & Olds (57) ABSTRACT

A controller for a motor vehicle cooling system thermostatic valve assembly, the assembly having a radiator bypass coolant flow inlet, a radiator coolant flow inlet and a coolant outlet, the assembly being configured to allow flow of coolant from the bypass coolant flow inlet to the coolant outlet and from the radiator coolant flow inlet to the coolant outlet, the assembly comprising means for controlling a flow rate of fluid from the radiator coolant flow inlet to the coolant outlet, the controller being configured to receive an ambient temperature signal indicative of an ambient air temperature, the controller being configured to control flow
(Continued)

of coolant from the radiator coolant flow inlet to the coolant outlet in dependence at least in part on the ambient temperature signal.

14 Claims, 8 Drawing Sheets

(52) U.S. Cl.
CPC ....... *F01P 2025/13* (2013.01); *F01P 2025/32* (2013.01); *F01P 2025/40* (2013.01); *F01P 2025/60* (2013.01); *F01P 2025/62* (2013.01); *F01P 2050/22* (2013.01); *F01P 2070/04* (2013.01)

(58) Field of Classification Search
CPC ............... F01P 2025/60; F01P 2025/62; F01P 2050/22; F01P 2070/04; G05D 23/134
USPC ........................................................ 123/41.1
See application file for complete search history.

(56) References Cited

U.S. PATENT DOCUMENTS

| | | | |
|---|---|---|---|
| 5,529,025 A | 6/1996 | Ranzinger et al. | |
| 5,975,031 A * | 11/1999 | Bartolazzi | F01P 7/164 |
| | | | 123/41.02 |
| 6,532,807 B1 | 3/2003 | Krauss | |
| 6,761,321 B2 * | 7/2004 | Takahashi | F01P 7/16 |
| | | | 236/34.5 |
| 7,114,469 B1 * | 10/2006 | Taylor | B63H 21/00 |
| | | | 123/41.08 |
| 2004/0065275 A1 | 4/2004 | Hayami et al. | |
| 2006/0005789 A1 * | 1/2006 | Miura | F01P 7/16 |
| | | | 123/41.1 |
| 2009/0205590 A1 * | 8/2009 | Vetrovec | F01P 11/20 |
| | | | 123/41.14 |
| 2012/0085157 A1 | 4/2012 | Nishigaki | |
| 2012/0247582 A1 * | 10/2012 | Lamb | F16K 11/044 |
| | | | 137/468 |
| 2013/0263800 A1 * | 10/2013 | Lee | F01P 7/16 |
| | | | 123/41.08 |
| 2014/0261254 A1 * | 9/2014 | Gonze | F01P 11/08 |
| | | | 123/41.08 |
| 2015/0114339 A1 * | 4/2015 | Sellnau | F02N 19/04 |
| | | | 123/294 |
| 2016/0169075 A1 * | 6/2016 | Dobryden | F01N 5/02 |
| | | | 165/138 |

FOREIGN PATENT DOCUMENTS

| | | |
|---|---|---|
| EP | 1336734 A2 | 8/2003 |
| JP | 2004156490 A | 6/2004 |
| JP | 2004360509 A | 12/2004 |
| WO | 96/29509 | 9/1996 |

OTHER PUBLICATIONS

Examination Report under Section 18(3) for Application No. GB1504053.8 dated Jun. 5, 2017.
Combined Search and Examination Report under Sections 17 and 18(3) for Application No. GB1504053.8 dated Jul. 30, 2015.

* cited by examiner

CONTROLLER FOR A MOTOR VEHICLE COOLING SYSTEM AND METHOD

TECHNICAL FIELD

The present disclosure relates to a controller for a motor vehicle cooling system and method. Aspects of the invention relate to at least a controller, a cooling system, a vehicle and a method.

BACKGROUND

It is known to provide a cooling system for cooling an engine of a motor vehicle. Cooling systems typically include a thermostatic pressure relief valve that controls the flow of coolant through a radiator of the cooling system in order to maintain the coolant, and therefore the engine, at an acceptable temperature. Thermostatic pressure relief valves are typically of the wax pellet type and arranged such that a valve permitting flow of coolant through the radiator is opened by thermal expansion of a wax pellet at a predetermined coolant temperature, the predetermined temperature being determined by the construction of the valve and thermal expansion properties of the wax pellet.

Known cooling systems suffer the disadvantage that under certain operating conditions the temperature of an engine may increase to relatively high values that result in relatively rapid deterioration of one or more components thereof such as spark plug tips, in the case of petrol engines, or one or more other components. For example, relatively sudden increases in the temperature of coolant at an engine coolant outlet can occur in the event a vehicle is towing a load downhill against a headwind in relatively high ambient temperatures with light throttle application and subsequently begins to climb a relatively steep hill with no headwind, possibly a tailwind, and relatively heavy throttle application. The cooling system may be unable to maintain the engine temperature within a preferred operating temperature range in these circumstances, resulting in excessive engine component degradation.

It is an aim of the present invention to address disadvantages associated with the prior art.

SUMMARY OF THE INVENTION

Aspects of the invention relate to a controller, a cooling system, a vehicle, a method, a carrier medium, a computer program product, a computer readable medium and a processor. Embodiments of the invention may be understood with reference to the appended claims.

In one aspect of the invention for which protection is sought there is provided a controller for a motor vehicle cooling system thermostatic valve assembly. The assembly may have a radiator bypass coolant flow inlet, a radiator coolant flow inlet and a coolant outlet. The assembly may be configured to allow flow of coolant from the bypass coolant flow inlet to the coolant outlet and from the radiator coolant flow inlet to the coolant outlet. The assembly may comprise means for controlling a flow rate of fluid from the radiator coolant flow inlet to the coolant outlet. The controller may be configured to control operation of the assembly to increase the flow rate of coolant from the radiator coolant flow inlet to the coolant outlet when a coolant temperature exceeds a first threshold coolant temperature. The first threshold coolant temperature may be dependent at least in part on a signal indicative of an ambient air temperature.

It is to be understood that the first threshold coolant temperature need not have a value that is specifically calculated or determined, but a value that is nevertheless controlled by the controller.

In another aspect of the invention for which protection is sought there is provided a controller for a motor vehicle cooling system thermostatic valve assembly, the assembly having a radiator bypass coolant flow inlet, a radiator coolant flow inlet, a coolant outlet and thermal actuator means comprising a thermostatic pressure relief valve of wax pellet type comprising a wax medium, the assembly being configured to allow flow of coolant from the bypass coolant flow inlet to the coolant outlet and from the radiator coolant flow inlet to the coolant outlet, the assembly comprising valve means provided in a flowpath of coolant from the radiator coolant flow inlet to the coolant outlet for controlling a flow rate of coolant from the radiator coolant flow inlet to the coolant outlet. The controller is configured to receive an ambient temperature signal indicative of an ambient air temperature, the controller being configured to control the flow rate of coolant from the radiator coolant flow inlet to the coolant outlet in dependence at least in part on the ambient temperature signal, the flow rate being controlled by causing opening of the valve means by causing heating, by means of heating means, of the wax medium comprised by the actuator means.

Embodiments of the present invention have the advantage that the operating temperature of an engine may be reduced in certain circumstances, such as in relatively high ambient temperature environments, in order to enhance vehicle operation and/or reduce excessive deterioration of one or more components cooled by the cooling system in the event of a relatively sudden increase in temperature of one or more components cooled by the system.

The components cooled by the cooling system may include an engine and/or a transmission.

Some embodiments of the invention have the feature that the operating temperature of the engine may be increased in some circumstances, such as in relatively cold ambient temperatures.

The actuator means may comprise a thermal actuator element or device, optionally of wax pellet type.

The controller may be configured to provide a predetermined amount of power to the heating means in dependence at least in part on the ambient temperature signal.

The heating means may comprise a heating element, optionally an electrical heating element.

The controller may be further configured to receive at least one further signal selected from amongst a knock signal indicative of an amount of knock suffered by the engine, a transmission oil temperature signal indicative of a temperature of a transmission oil and a mass flow rate signal indicative of a mass flow rate of engine intake air, the controller being configured to cause a predetermined amount of power to be supplied to the heating means in dependence at least in part on the at least one further signal.

The controller may be configured to receive the mass flow rate signal and an engine coolant temperature signal indicative of a temperature of coolant at an engine coolant outlet, the controller being configured to control the flow of coolant from the radiator coolant flow inlet to the coolant outlet of the assembly in order to attempt to maintain a predetermined relationship between the mass flow rate signal and engine coolant temperature signal.

The controller may be configured to cause heating of the heating means by controlling a duty cycle of an electrical signal supplied thereto.

In one aspect of the invention for which protection is sought there is provided a controller according to a preceding aspect in combination with the motor vehicle cooling system thermostatic valve assembly.

The assembly may comprise valve means for controlling the flow of coolant from the radiator coolant flow inlet to the coolant outlet of the assembly, the valve means being actuated by thermal actuator means of the assembly, the controller being arranged to supply electrical current to heating means of the thermostatic valve assembly to causing heating of wax medium comprised by the thermal actuator means.

Optionally, the wax medium is provided in thermal communication with coolant flowing into the assembly from the radiator bypass coolant flow inlet and coolant flowing into the assembly from the radiator coolant flow inlet, wherein under substantially static coolant conditions a temperature of the wax medium is determined at least in part by the temperature of coolant at the bypass coolant flow inlet and the temperature of coolant at the radiator coolant flow inlet.

Optionally, under substantially static coolant conditions a relative contribution to the temperature of the wax medium of coolant at the radiator coolant flow inlet compared to that at the bypass coolant flow inlet is at least 10%.

It is to be understood that the thermal actuator means may be configured such that the relative surface areas of wax medium therein that are exposed to coolant from the radiator bypass inlet and radiator inlet are in the ratio from around 80:20 to 90:1, optionally around 85:15.

In a further aspect of the invention for which protection is sought there is provided a motor vehicle engine cooling system comprising a controller according to a preceding aspect.

It is to be understood that the thermal actuator means may be configured to cause the valve means to open as a consequence of heating of the wax medium by engine coolant with no additional heating by means of electrical heating means. Under certain circumstances the controller may not cause any additional heating of the wax medium, and allow it to open as a consequence of thermal expansion due to heating by coolant alone. However, in the event that the ambient temperature exceeds a predetermined threshold ambient temperature value, the controller may be configured to cause heating of the wax medium, optionally by means of electrical heating means such as an electrical heating element, in order to cause opening of the valve means at a lower engine coolant temperature than would otherwise cause opening of the valve means. This causes a reduction in engine operating temperature relative to that which would otherwise prevail. Thus, intervention by the controller in causing opening of the valve means may only occur in certain ambient temperature conditions, in some arrangements.

The assembly may be further configured to control a flow rate of coolant from the coolant bypass to inlet to the coolant outlet. The assembly may comprise a valve for regulating flow of coolant from the bypass inlet to the coolant outlet, whereby as the pressure of coolant at the inlet increases the valve opens to accommodate the flow rate. The valve may open against a resilient closure element that tends to cause the valve to close such as a spring element, optionally a helical spring element.

In a still further aspect of the invention for which protection is sought there is provided a method of controlling a motor vehicle cooling system thermostatic valve assembly having a radiator bypass coolant flow inlet, a radiator coolant flow inlet, a coolant outlet and thermal actuator means comprising a thermostatic pressure relief valve of wax pellet type comprising a wax medium. The method may comprise allowing flow of coolant from the bypass coolant flow inlet to the coolant outlet and controlling a flow rate of coolant by causing opening of valve means provided in a flowpath of coolant from the radiator coolant flow inlet to the coolant outlet, the valve means being opened by causing heating, by means of heating means, of the wax medium comprised by the actuator means. The method may comprise receiving an ambient temperature signal indicative of an ambient air temperature and controlling the flow rate of coolant from the radiator coolant flow inlet to the coolant outlet in dependence at least in part on the ambient temperature signal.

In other words, the method may comprise causing opening of the valve means by causing heating, by means of heating means, of a wax medium comprised by thermal actuator means.

The method may comprise providing a predetermined amount of power to the heating means in dependence at least in part on the ambient temperature signal.

The method may comprise receiving at least one further signal selected from amongst a knock signal indicative of an amount of knock suffered by the engine, a transmission oil temperature signal indicative of a temperature of a transmission oil and a mass flow rate signal indicative of a mass flow rate of engine intake air, the method comprising causing a predetermined amount of power to be supplied to the heating means in dependence at least in part on the at least one further signal.

Optionally, the method comprises receiving the mass flow rate signal and an engine coolant temperature signal indicative of a temperature of coolant at an engine coolant outlet, the method comprising controlling the flow of coolant from the radiator coolant flow inlet to the coolant outlet of the assembly in order to attempt to maintain a predetermined relationship between the mass flow rate signal and engine coolant temperature signal.

The method may comprise causing heating of the heating means by controlling a duty cycle of an electrical signal supplied thereto.

In one aspect of the invention for which protection is sought there is provided a method of controlling a motor vehicle cooling system thermostatic valve assembly, the assembly having a radiator bypass coolant flow inlet, a radiator coolant flow inlet and a coolant outlet, the assembly being configured to allow flow of coolant from the bypass coolant flow inlet to the coolant outlet and from the radiator coolant flow inlet to the coolant outlet, the assembly comprising means for controlling a flow rate of fluid from the radiator coolant flow inlet to the coolant outlet. The method may comprise controlling operation of the assembly to increase the flow rate of coolant from the radiator coolant flow inlet to the coolant outlet when a coolant temperature exceeds a first threshold coolant temperature, the first threshold coolant temperature being dependent at least in part on a signal indicative of an ambient air temperature.

In an aspect of the invention for which protection is sought there is provided a carrier medium carrying computer readable code for controlling a vehicle to carry out the method of a preceding aspect.

In one aspect of the invention for which protection is sought there is provided a computer program product executable on a processor so as to implement the method of a preceding aspect.

In an aspect of the invention for which protection is sought there is provided a computer readable medium loaded with the computer program product of a preceding aspect.

In a further aspect of the invention for which protection is sought there is provided a processor arranged to implement the method of a preceding aspect, or the computer program product of a preceding aspect.

In one aspect of the invention for which protection is sought there is provided a controller for a motor vehicle cooling system thermostatic valve assembly, the assembly having a radiator bypass coolant flow inlet, a radiator coolant flow inlet and a coolant outlet. The assembly is configured to allow flow of coolant from the bypass coolant flow inlet to the coolant outlet and from the radiator coolant flow inlet to the coolant outlet in a known manner. The assembly has means for controlling a flow rate of fluid from the radiator coolant flow inlet to the coolant outlet in the form of a valve actuated by a thermal actuator. The thermal actuator is in the form of a wax pellet-type actuator that causes opening of the valve when the temperature of a wax medium therein exceeds a predetermined temperature that is dependent on the composition of the wax medium. Opening of the valve by the thermal actuator causes engine coolant to flow through the radiator and effect cooling of the coolant and therefore the engine. The thermal actuator has an electrical heating element to allow heating of the wax medium electrically, in addition to heating due to coolant. The controller is configured to receive an ambient temperature signal that is indicative of ambient temperature, and to cause heating of the wax medium by the heating element in dependence at least in part on the ambient temperature signal. In an embodiment, when ambient temperature is above a predetermined value such as 40 C, the controller causes a predetermined amount of heating power to be delivered to the wax medium by the heating element, causing the valve to open at a lower coolant temperature. This has the effect of causing the engine to run at a lower temperature than would otherwise be the case. Running the engine at a lower temperature can reduce the risk that the temperature of the engine experiences an excursion to excessively elevated temperatures in the event that a relative high engine torque demand occurs relatively suddenly during vehicle operations, and/or the effectiveness of engine cooling by the radiator is reduced, for example due to the vehicle experiencing a tailwind rather than a headwind. Thus, any temperature increase resulting from such scenarios occurs from a lower starting temperature than in vehicles not having the feature of electrical heating of the thermal actuator in dependence on ambient temperature, reducing the peak operating temperature of the engine. Other arrangements may be useful.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
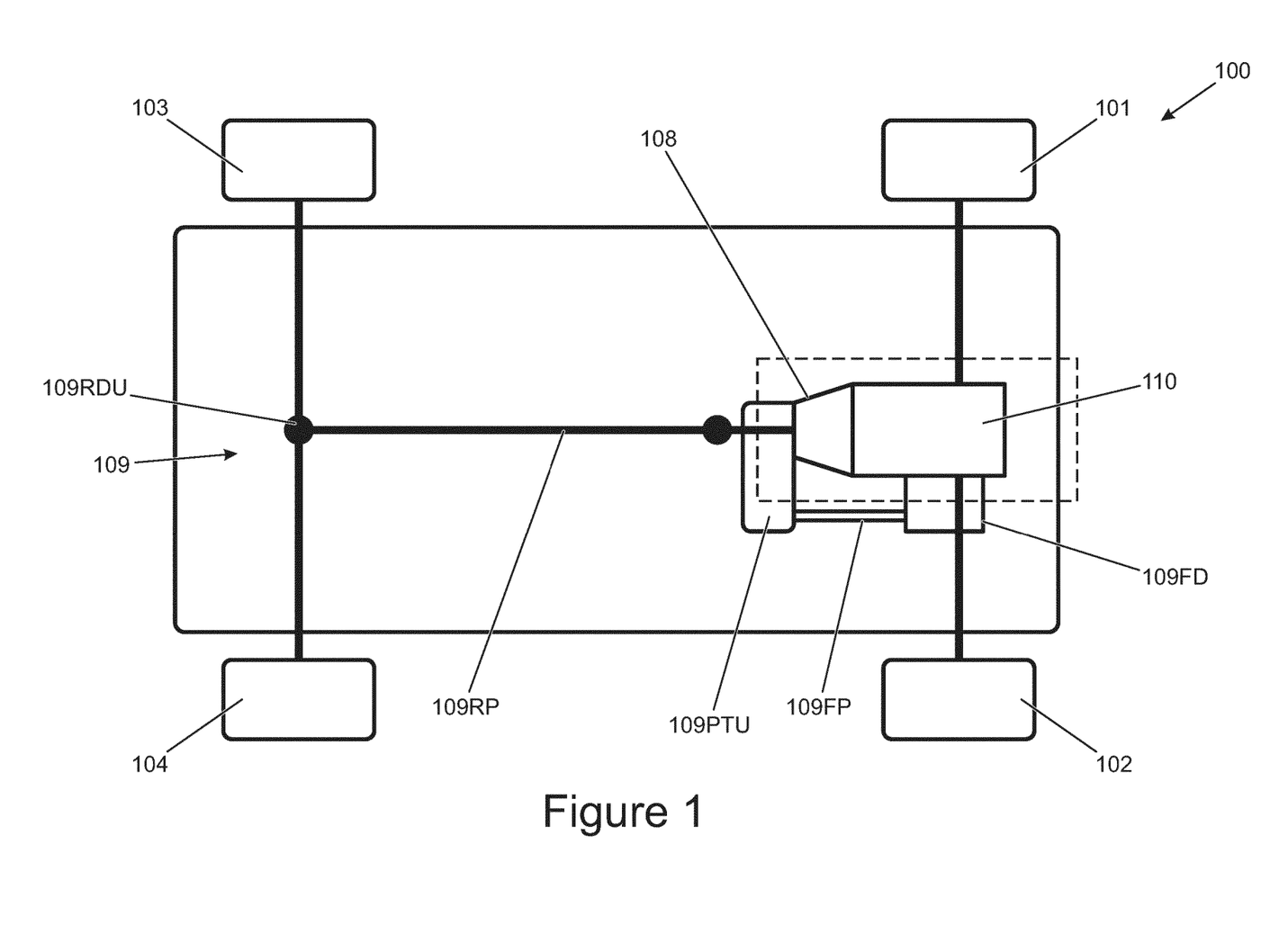
FIG. 1 is a schematic illustration of a vehicle according to an embodiment of the present invention.

FIG. 1 shows a vehicle 100 according to an embodiment of the present invention. The vehicle 100 has an internal combustion engine 110 operable to provide motive torque to a transmission 108. The vehicle 100 has a driveline 109 by means of which the transmission 108 may be coupled to a pair of rear wheels 103, 104 of the vehicle 100 by means of a rear prop shaft 109RP and rear drive unit 109RDU. The transmission 108 is releasably connectable to a pair of front wheels 101, 102 by means of a power transfer unit (PTU) 109PTU having a power transfer clutch (not shown), front prop shaft 109FP and front differential gear box 109FD, which also form part of the driveline 109.

Figure 2:
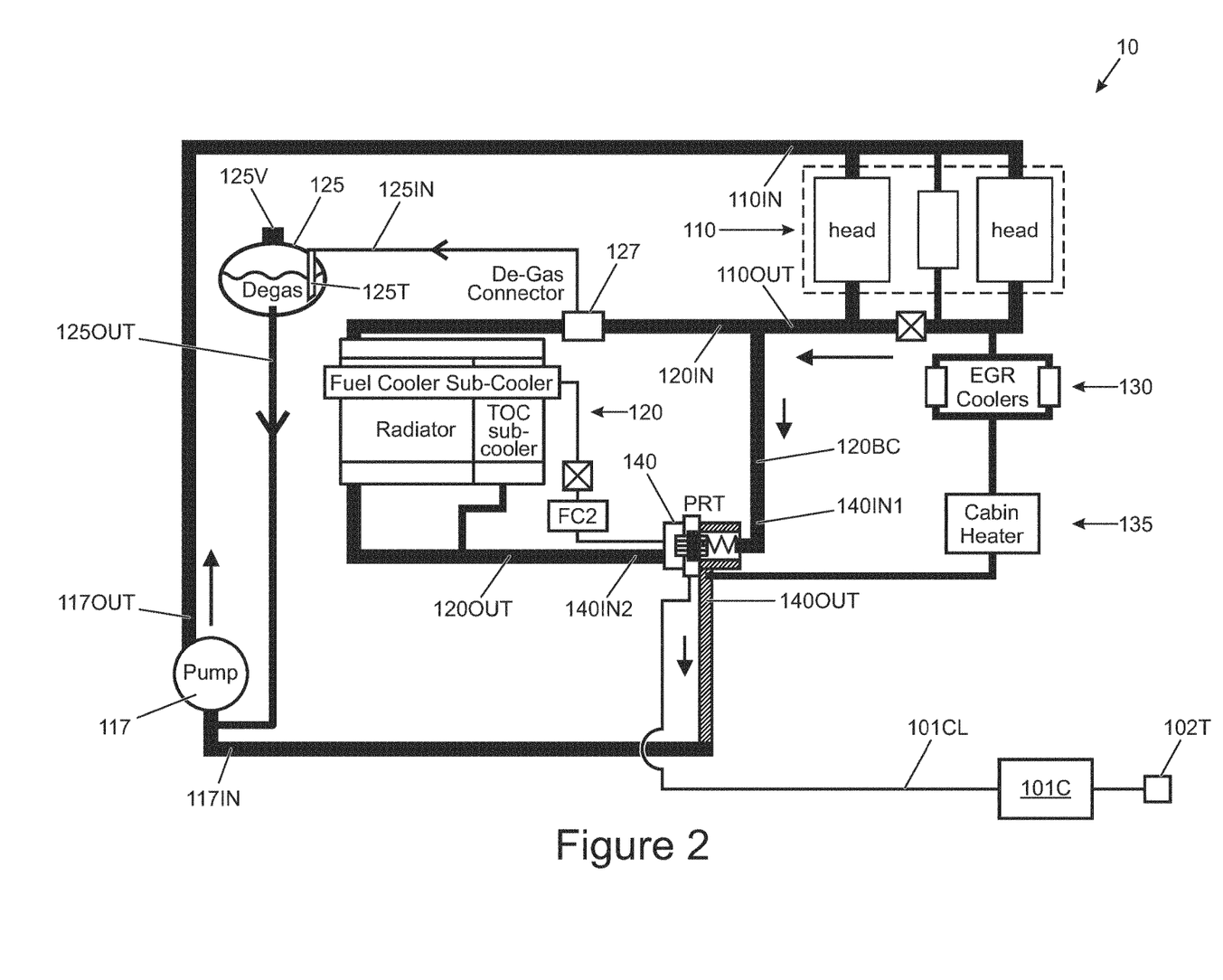
FIG. 2 is a schematic illustration of an engine cooling system of the vehicle of the embodiment of FIG. 1.

FIG. 2 shows a cooling circuit 10 of the vehicle 100 of FIG. 1. An engine-driven fluid pump 117 is provided for pumping coolant when the engine 110 is running. The pump 117 draws coolant through an inlet 117IN of the pump and forces the coolant through an outlet 117OUT of the pump 117, the outlet 117OUT being coupled to an inlet 110IN of the engine 110.

An outlet 110OUT of the engine 110 is coupled by means of a T-connector to a radiator 120 via a radiator inlet conduit 120IN and to a radiator bypass conduit 120BC. The radiator 120 is arranged to cool coolant flowing therethrough in the conventional manner. The bypass conduit 120BC is in turn coupled to an inlet of a pressure relief thermostatic valve assembly (PRT) 140. The PRT 140 has thermal actuator means in the form of a thermal actuator portion 140A of the wax pellet type. The actuator portion 140A contains a wax medium, thermal expansion of which allows regulation of the flow of coolant through the radiator 120 as described in more detail below.

The PRT 140 has a first inlet 140IN1 arranged to receive a flow of coolant from the bypass conduit 120BC (also referred to as a radiator bypass coolant flow inlet 140IN1) and a second inlet 140IN2 arranged to receive a flow of fluid (coolant) from a coolant outlet 120OUT of the radiator 120 (also referred to as a radiator coolant flow inlet). Means for controlling a flow rate of coolant in the form of valve means in the form of a first coolant inlet valve 140V1 is provided in a flowpath of fluid from the first fluid inlet 140IN1 to the fluid outlet 140OUT, and a second valve means in the form of a second coolant inlet valve 140V2 is provided in a flowpath of fluid from the second fluid inlet 140IN2 to the fluid outlet 140OUT. The PRT 140 regulates the flow of coolant through the radiator 120 and bypass conduit 120BC according to the rate at which coolant is being pumped through the engine 110 by coolant pump 117 and the temperature of the thermal actuator portion 140A. The temperature of the thermal actuator portion is influenced both by coolant at the first inlet 140IN1 (from the bypass conduit 120BC) and coolant at the second inlet 140IN2 (from the radiator 120). The thermal actuator portion 140A is configured such that, under substantially static (no flow) or low flow rate coolant conditions at the first and second inlets 140IN1, 140IN2, the temperature of the wax medium is determined by the temperatures of the coolant at the first and second inlets 140IN1, 140IN2 in the ratio 85:15 (17:3). Coolant flowing through the first inlet 140IN1 may be referred to as a 'hot flow' or as being on the 'hot side' of the PRT 140 because it has come substantially directly from the engine 110 without being cooled by the radiator 117. In contrast, coolant flowing through the second inlet 140IN2 may be referred to as a 'cold flow' or as being on the 'cold side' of the PRT 140 because it has passed through the radiator 117.

Thus, the temperature of the wax medium will be influenced primarily by the temperature of coolant flowing through the first inlet 140IN1 with a bias of approximately 15% due to coolant at the second inlet 140IN2. In the case of a relatively high flow rate of fluid through the first inlet 140IN1, the temperature of the wax medium will tend to be more highly dominated by the temperature of coolant flowing through the first inlet 140IN1.

An exhaust gas recirculation (EGR) cooler arrangement 130 and cabin heater matrix 135 are coupled in series between the outlet 110OUT of the engine 110 and outlet 140OUT of the PRT 140. Thus the EGR cooler arrangement 130 and heater matrix 135 receive a flow of 'hot' coolant directly from the engine outlet conduit 110 regardless of the state of the PRT 140.

The outlet 140OUT of the PRT 140 is coupled to the inlet 117IN of the engine-driven fluid pump 117.

It is to be further understood that in some arrangements the engine-driven fluid pump 117 could instead be an electrically-driven fluid pump.

In the arrangement of FIG. 2 the inlet 120IN of the radiator 120 has a de-gas connector 127 provided therein arranged to allow a portion of the fluid flowing through the inlet 120IN to be drawn through a de-gasification tank 125. The degasification tank 125 has a gas vent 125V arranged to allow gas entrained in the flow of coolant to be released from the tank 125 to atmosphere.

The tank 125 has an outlet 125OUT coupled to the inlet 117IN of the engine-driven fluid pump 117. The action of the pump 117 is arranged to draw coolant through the de-gasification tank 125.

The de-gasification tank 125 has a dip-tube 125T arranged such that fluid flowing into the tank 125 through the inlet 125IN is introduced into the tank in a lower region of the tank below a normal expected operating level of coolant in the tank. This feature has the advantage that if a reverse flow of coolant occurs through the tank, i.e. coolant flows into the tank 125 through the outlet 125OUT, gas contained within the de-gasification tank 125 is not forced out of the tank through the inlet 125IN. Rather, in the arrangement shown a reverse flow of coolant into the de-gasification tank 125 would result in a flow of coolant (rather than gas) out from the tank 125 through the inlet 125IN by virtue of the dip-tube 125T.

Figure 3:
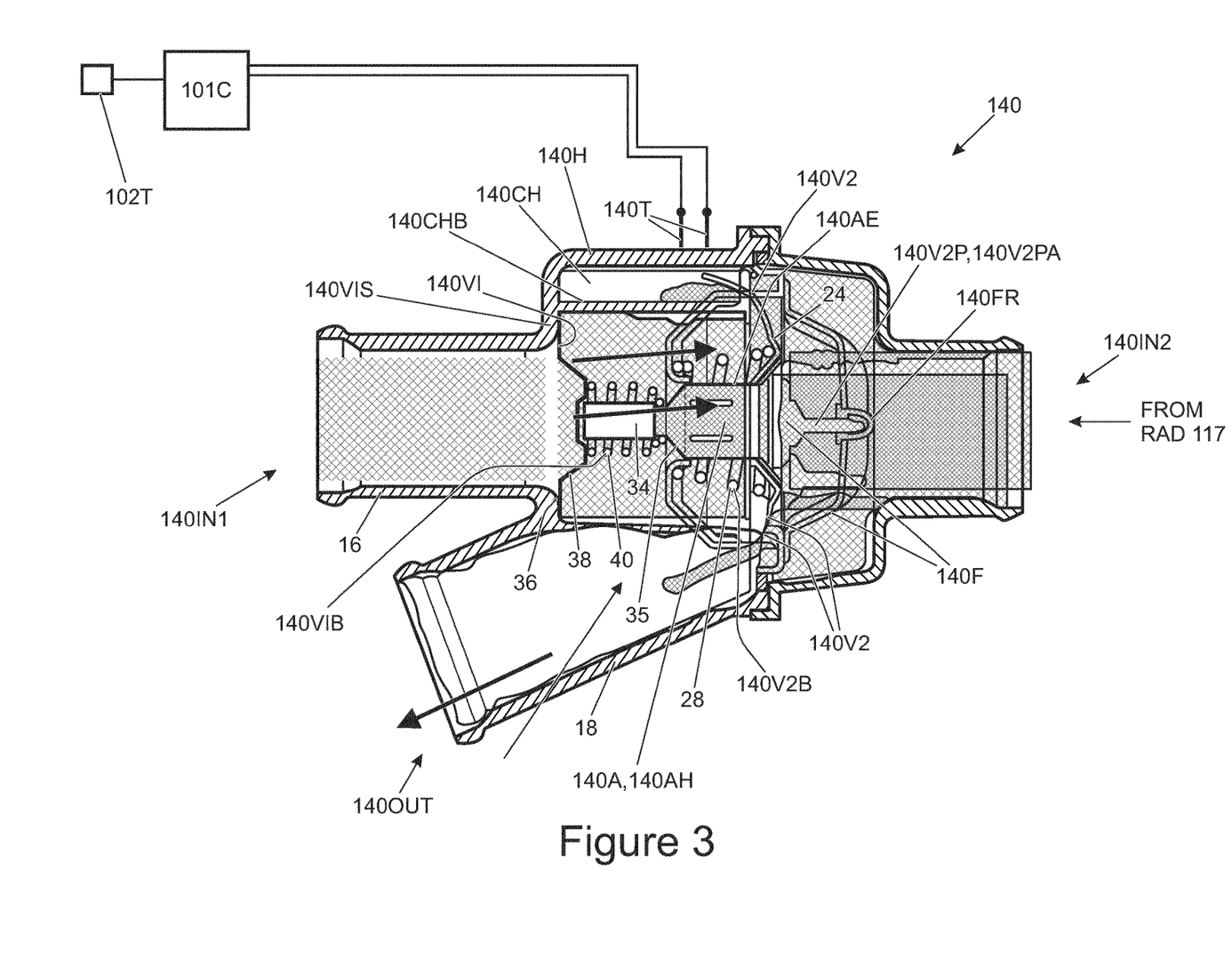
FIG. 3 is a schematic illustration of a thermostatic valve assembly of the cooling system of FIG. 2.

The PRT 140 is shown enlarged in FIG. 3. The PRT 140 is shown in a condition in which the first coolant inlet valve 140V1, provided in the flowpath of fluid from the first fluid inlet 140IN1 to the fluid outlet 140OUT, is in a closed condition. The second coolant inlet valve 140V2, provided in a flowpath of fluid from the second fluid inlet 140IN2 to the fluid outlet 140OUT, is also shown in the closed condition. The first coolant inlet valve 140V1 may be moved axially away from a valve seat 140V1S provided by a housing 140H of the PRT 140 against a bias provided by a helical coil spring element 140V1B if a pressure of coolant at the inlet 140IN1 is sufficiently high. The bias provided by the spring element 140V1B is chosen such that, when the engine 110 is running at idle, the first coolant inlet valve 140V1 is opened by an amount sufficient to allow a relatively small amount of coolant flow through the first fluid inlet 140IN1, being an amount sufficient to cause adequate coolant flow through the engine 110. At relatively high engine speeds (resulting in relatively high coolant flow rates due to the higher pumping rate of the engine driven fluid pump 117), the first inlet valve 140V1 may be substantially fully opened by the pressure of coolant at the inlet 140IN1.

As noted above, the PRT 140 has a thermal actuator portion 140A of the wax pellet type, of known construction, having a piston element 140V2P having a first portion (not shown) provided within a cylindrical housing 140AH and a second portion 140V2PA projecting out from the housing 120AH into abutment with a support frame 140F through which coolant may flow. A tip of the piston element 140V2P sits within a recess 140FR formed in the support frame 140F. The support frame 140F is rigidly coupled to the housing 140H of the PRT 140.

A pellet of a wax medium is sealed within the housing 140AH of the actuator portion 140A and substantially surrounds the portion of the piston therein. The actuator portion 140A is configured such that thermal expansion of the wax medium therein causes a pressure to be exerted on the piston 140V2P, urging the piston axially out from the housing 140AH. This causes a force to be exerted by the piston 140V2P and wax medium against the frame 140F, causing the housing 140AH to be moved axially in a direction away from the frame 140F. The housing 140AH is coupled to the inlet valve 140V2 at an end of the housing 140AH proximal the frame 140F, the pin element 140V2P emerging from the housing 140AH on an opposite side of the inlet valve 140V2 to the housing 140AH. Accordingly, as the housing 140AH moves, the inlet valve 140V2 moves from a retracted position in which the valve 140V2 is closed, to an extended position in which the valve 140V2 is open, the amount by which the valve 140V2 is open depending on the temperature of the wax medium. In the present embodiment the second inlet valve 140V2 transitions (or travels) from fully closed to fully open positions over a temperature range of approximately 14 C. The distance travelled by the valve 140V2 from its closed position at a given moment may be designated D2.

Axial movement of the housing 140AH causes axial movement of the valve 140V2 in the direction of coolant flow through the second inlet 140IN2 against a spring element 140V2B that is provided in compression when the valve 140V2 is in the closed condition. Opening of the valve 140V2 causes further compression of the spring element 140V2B. As the second coolant inlet valve 140V2 opens, coolant is enabled to flow from the second inlet 140IN2 to the outlet 140OUT. The presence of the spring element 140V2B permits closure of the inlet valve 140V2 when the wax medium subsequently cools.

The PRT 140 is configured such that coolant flowing through the second inlet 140IN2 does not flow in contact with the housing 140AH of the actuator portion 140A. This allows coolant flowing through the first inlet 140IN1 to continue to dominate the temperature of wax medium within the housing 140AH. Control of coolant flow from the radiator 120 is achieved by directing coolant flowing past the second inlet valve 140V2 along a circumferential channel 140CH that is separated from fluid flowing over the housing 140AH of the actuator portion 140A by a substantially cylindrical baffle wall 140CHB radially spaced apart from the housing 140AH and which substantially surrounds the housing 140AH except in the vicinity of the coolant outlet 140OUT.

As noted above, the amount by which the valve 140V2 is opened, D2, depends upon the amount by which the wax medium expands. It is to be understood that in the embodiment of FIG. 3 the wax medium is arranged such that it begins to cause the piston 140V2P to push against the second inlet valve 140V2 to open the valve 140V2 when the wax medium is at a temperature of around 94 C, the piston 140V2P reaching its limited of travel out from the housing 140AH when the wax medium reaches a temperature of around 108 C. Other temperatures may be useful in some embodiments.

It is to be understood that, in relatively mild ambient temperature conditions of around 10 Celsius (10 C) and with a relatively large flow rate of air over the radiator 120, the radiator 120 may effect cooling of coolant flowing thereover by up to around 90 C or more. Accordingly, at relatively low coolant flow rates (i.e. with the engine operating at a relatively low speed) the thermal actuator portion 140A may cause the valve 140V2 to open by only a relatively small amount. In contrast, in relatively high ambient temperature conditions the radiator 120 may be capable of effecting only a relatively small drop in coolant temperature, for example around 5 to 10 C, and so the thermal actuator portion 140A may cause the piston to be translated to its limit of travel, causing the second inlet valve 140V2 to become fully open.

The PRT 140 has electrical heating means in the form of an electrical heating element 140AE provided within the housing 140AH of the actuator portion 140A. The heating element 140AE is coupled to a pair of electrical terminals 140T that protrude through the housing 140H of the PRT 140. The terminals 140T are coupled to control means in the form of a controller 101C shown in FIG. 2 and FIG. 3 via signal line 101CL. The controller 101C is configured to apply a pulsed potential difference between the terminals 140T to cause an electrical signal in the form of a pulsed electrical current to flow through the heating element 140AE to cause heating of the wax medium when required.

The controller 101C is also coupled to a temperature sensor 102T by means of which the controller 101C receives an ambient temperature signal T_amb indicative of an ambient air temperature.

As described above, PRT 140 is configured such that, if the heating element 140AE is not employed to cause heating of the wax medium, the second inlet valve 140V2 is caused to begin to open when a temperature of the wax medium reaches a temperature T_HI which in the embodiment illustrated is around 94 C, and is fully open when the wax medium reaches a temperature of around 108 C, approximately 14 C higher than T_HI. Such operation is illustrated in plot P1 of FIG. 4, where the amount of travel of the second inlet valve 140V2, D2, is plotted as a function of temperature.

In use, the controller 101C is configured to apply a pulsed electrical potential to the electrical heating element 140AE of the PRT 140 via signal line 101CL when the ambient temperature exceeds a predetermined value. In the present embodiment the predetermined value is 40 C. At 40 C, the potential is applied with a duty cycle of approximately 10% in the present embodiment. Since the heating element 140AE is capable of up to 20 W of heating at a duty cycle of 100% (corresponding to a substantially continuous potential) a duty cycle of 10% causes approximately 2 W of heat energy to be provided to the wax medium. The controller 101C is configured such that, at an ambient temperature of 50 C or more the potential is applied with a duty cycle of approximately 20%. Other arrangements may be useful in some embodiments, including different values of heating power, duty cycle, predetermined temperature values and so forth. For example, one or more further predetermined threshold values of ambient temperature may be employed for setting the duty cycle of the pulsed potential applied to the heating element 140AE.

It is to be understood that, by providing thermal energy to the wax medium by means of the heating element 140AE in addition to any thermal energy from coolant at the first or second inlets 140IN1, 140IN2, the controller 101C is able to cause the second inlet valve 140V2 to begin to open at lower coolant temperatures.

Figure 4:
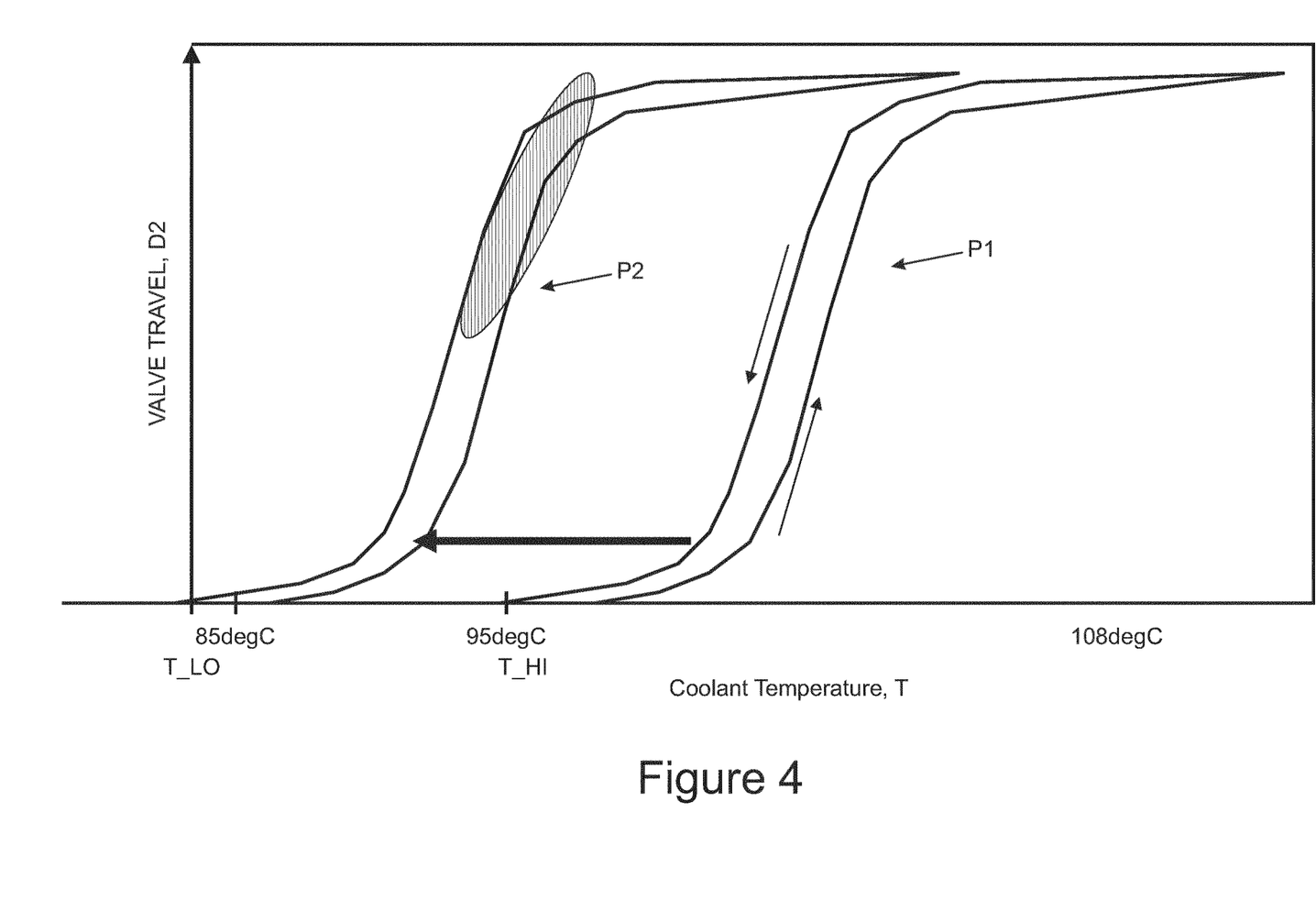
FIG. 4 is a plot of valve travel as a function of coolant temperature for cooling system of FIG. 2.

Plot P2 of FIG. 4 illustrates opening of the second inlet valve 140V2 at a temperature T_LO of around 85 C when the ambient temperature exceeds 40 C and the controller 101C causes 2 W of heating power to be provided to the heating element 140AE. It can be seen that D2 begins to increase from substantially zero, as the coolant temperature passes 85 C, the valve being fully open at a temperature of around 94 C.

As noted above, in the present embodiment, the heating element 140AE is capable of providing up to around 20 W of heat energy. Other values may be useful in some embodiments. The amount of heat energy supplied by the element 140AE in some embodiments in use is typically in the range from around 3 W to around 10 W.

In some embodiments, the amount of heat energy provided by the heating element 140AE may be such as to cause the PRT 140 to open the second inlet valve 140V2 when the temperature of engine coolant flowing from the bypass conduit 120BC through the first coolant inlet 140IN1 is at a temperature that is in the range from 5 C to 15 C lower than in the case that no current is caused to flow through the heating element 140AE.

It is to be understood that causing the second valve 140V2 to open at lower coolant temperatures causes the operating temperature of the engine 110 to be reduced relative to that in the absence of such opening. This feature is useful in hotter ambient temperature environments because it enables the controller 101C to maintain the cooling system 101 in a condition in which sufficient "headroom" exists in terms of available coolant temperature range above the coolant temperature at which opening of the valve 140V2 occurs, to allow an operating temperature of the engine 110 to be prevented from exceeding a maximum desirable operating temperature in the event of a relatively sudden increase in the temperature of coolant at the engine outlet conduit 110OUT. Such an increase might occur, for example, if the vehicle 100 is towing a load downhill against a headwind in relatively high ambient temperatures with light throttle application, before beginning to climb a relatively steep hill with no headwind, possibly a tailwind, and relatively heavy throttle application. Relatively severe, abrupt changes in engine loading may be not infrequent in some operating environments, resulting in an increased risk of excessive engine degradation due to thermal loading.

It is to be understood that increased engine fuel efficiency and reduced emissions may be achieved by increasing the operating temperature of an engine in some cases, particularly when operating in cold ambient environments where engines may otherwise operate at lower than ideal temperatures due to the severity of cooling in cold environments. In order to cause an increase in engine operating temperature in colder ambient environments the PRT 140 of FIG. 3 is configured to cause a thermal bias to be applied to the thermal actuator portion 140A by coolant present at the second inlet 140IN2 as described above. In the present embodiment, a thermal bias of approximately 15% is provided by coolant at the second inlet 140IN2 when coolant flow rates through the first and second inlets 140IN1, 140IN2 are relatively low. The actual amount of bias, in practice, may depend on the flow rate of fluid through each inlet, high flow rates resulting in higher amounts of bias. For example, a relatively high flow rate of relatively hot coolant may cause a greater amount of heat input to the actuator portion 140A compared with relatively static flow conditions.

In some alternative embodiments, the controller 101C may be configured to receive more than one input signal in dependence on which the controller 101C determines when to trigger heating of the wax medium. That is, the controller 101C may receive at least one signal in addition to a signal indicative of ambient temperature $T\_amb$.

Figure 5:
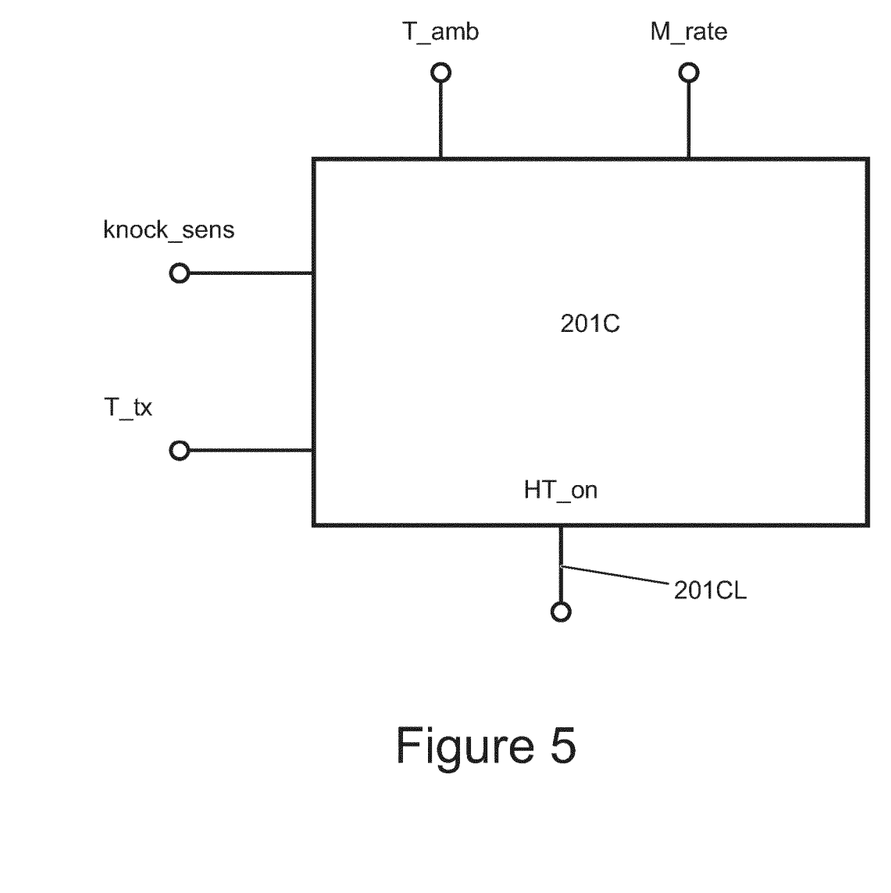
FIG. 5 is a schematic illustration of a controller of a cooling system according to an embodiment of the present invention.

A controller 201C according to a further embodiment is illustrated in FIG. 5. Like features of the embodiment of FIG. 5 to those of the embodiment shown in FIGS. 1 and 2 are shown with like reference signs incremented by 100.

The controller 201C is configured to receive a signal $T\_tx$ indicative of a temperature of oil flowing through the transmission 108, a knock signal $knock\_sens$ indicative of whether the engine 110 is exhibiting knock, an ambient temperature signal $T\_amb$ indicative of ambient temperature and a mass flow rate signal $M\_rate$ indicative of the mass flow rate of air into the engine 110. It is to be understood that the signal $M\_rate$ provides a useful indication of the amount of loading on the engine 110/powertrain at a given moment in time.

The controller 201C is configured to monitor each of the signals $T\_tx$, $knock\_sens$, $T\_amb$ and $M\_rate$ input thereto and to determine whether it is desirable to reduce engine operating temperature by triggering heating of the wax medium. If the controller 201C determines that a reduction in engine operating temperature is desirable, the controller 201C outputs a signal $HT\_on$ that causes a pulsed electrical current to flow through the heating element 140AE of the PRT 140 via signal line 201CL in a similar manner to the controller 101C of the embodiment of FIG. 1 and FIG. 2.

The manner in which the controller 201C determines whether the heating element 140AE should be activated will now be described. The controller 201C is provided with a threshold value of signal $T\_tx$, $T\_tx\_th$, signal $knock\_sens$, $knock\_sens\_th$, signal $T\_amb$, $T\_amb\_th$ and signal $M\_rate$, $M\_rate\_th$. If the value of any one of the signals exceeds the respective threshold value then the controller 201C causes the pulsed signal to flow through the heating element 140AE with a duty cycle of a predetermined value, in the present embodiment approximately 20%, causing heating power of around 4 W to be provided by the the heating element 140AE. It is to be understood that in some alternative embodiments the size of the duty cycle may be varied in dependence on the value off $T\_tx$, $knock\_sens$, $T\_amb$ and/or $M\_rate$.

In some embodiments, a more complex algorithm may be employed to determine whether heating of the heating element 140AE should take place. For example, in some embodiments the values of two or more of the signals $T\_tx$, $knock\_sens$, $T\_amb$ and $M\_rate$ may be weighted, and a determination made whether (say) a weighted sum of the values exceeds a predetermined threshold value. In some embodiments the value of one or more of $T\_tx\_th$, $knock\_sens\_th$ and $M\_rate\_th$ may be determined in dependence on the prevailing value of $T\_amb$. In some embodiments one or more of the values $T\_tx\_th$, $knock\_sens\_th$ and $M\_rate\_th$ may be arranged to decrease with increasing values of $T\_amb$.

In some embodiments the controller may, in addition to or instead of causing a pulsed current signal with a predetermined duty cycle to flow through the heating element 140AE, be configured to control the amount of current flowing through the heating element 140AE to be one of a plurality of discrete, non-zero values of current or a value from a substantially continuous range of values of current.

Figure 6:
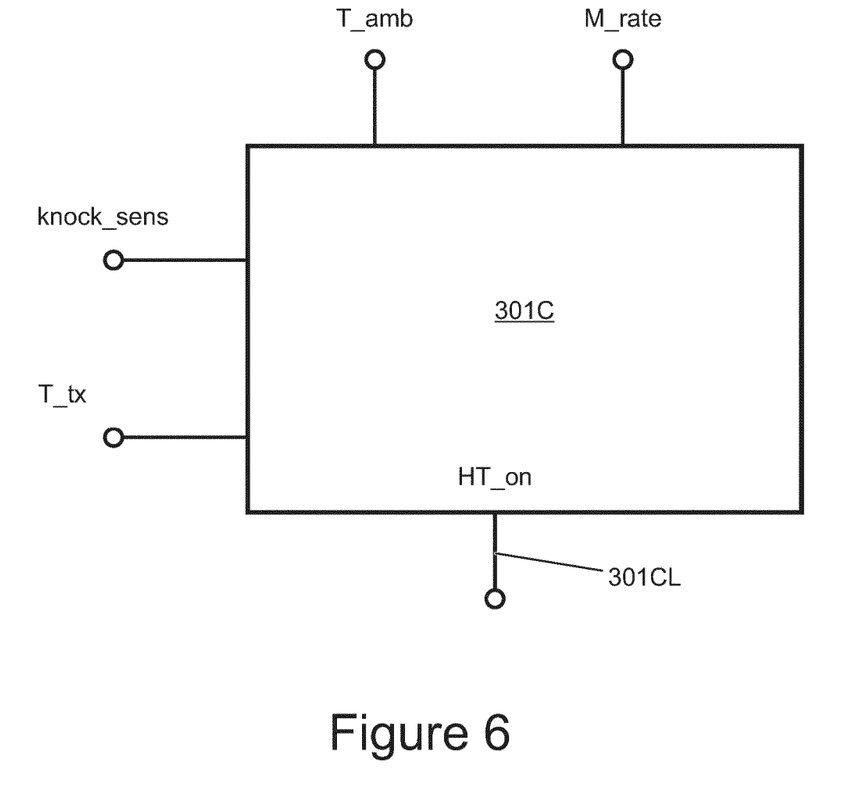
FIG. 6 is a schematic illustration of a controller of a cooling system according to a further embodiment of the present invention.

FIG. 6 illustrates a controller 301C according to a further embodiment of the present invention. Like features of the controller of FIG. 6 to those of the controller of FIG. 5 are shown with like reference signs incremented by 100.

Figure 7:
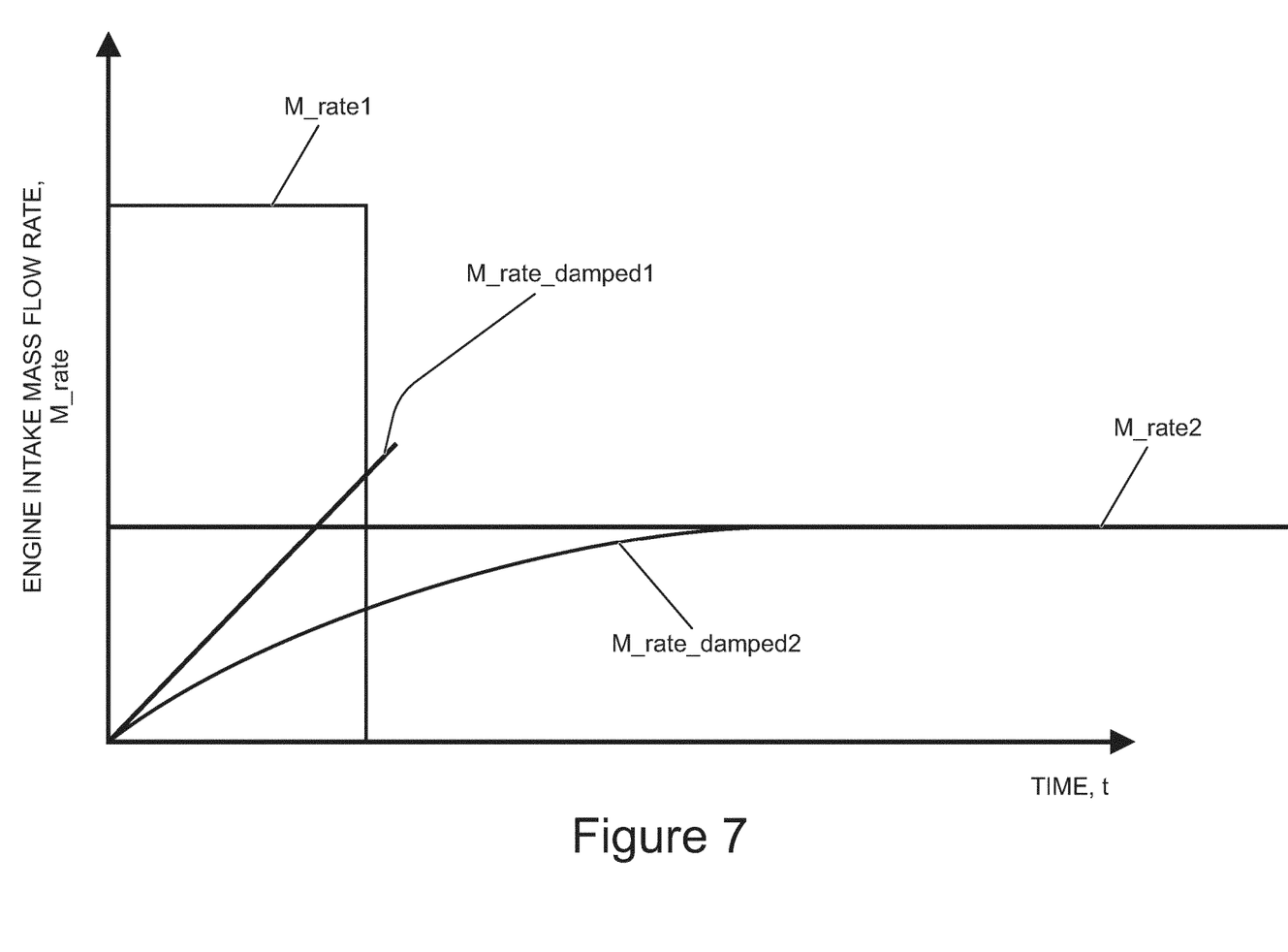
FIG. 7 shows two examples of the form of the variation in parameter M_rate_damped with M_rate as a function of time.

In some embodiments the controller may be configured to calculate a damped value of $M\_rate$, $M\_rate\_damped$, by subjecting real time substantially instant measured values of engine air mass flow rate $M\_rate$ to a low pass filter implemented in software or hardware. By way of illustration of the operation of the controller in calculating $M\_rate\_damped$, FIG. 7 illustrates values of damped mass flow rate, $M\_rate\_damped1$ for a first mass flow rate profile $M\_rate1$ and values of damped mass flow rate, $M\_rate\_damped2$ for a second mass flow rate profile $M\_rate2$.

Figure 8:
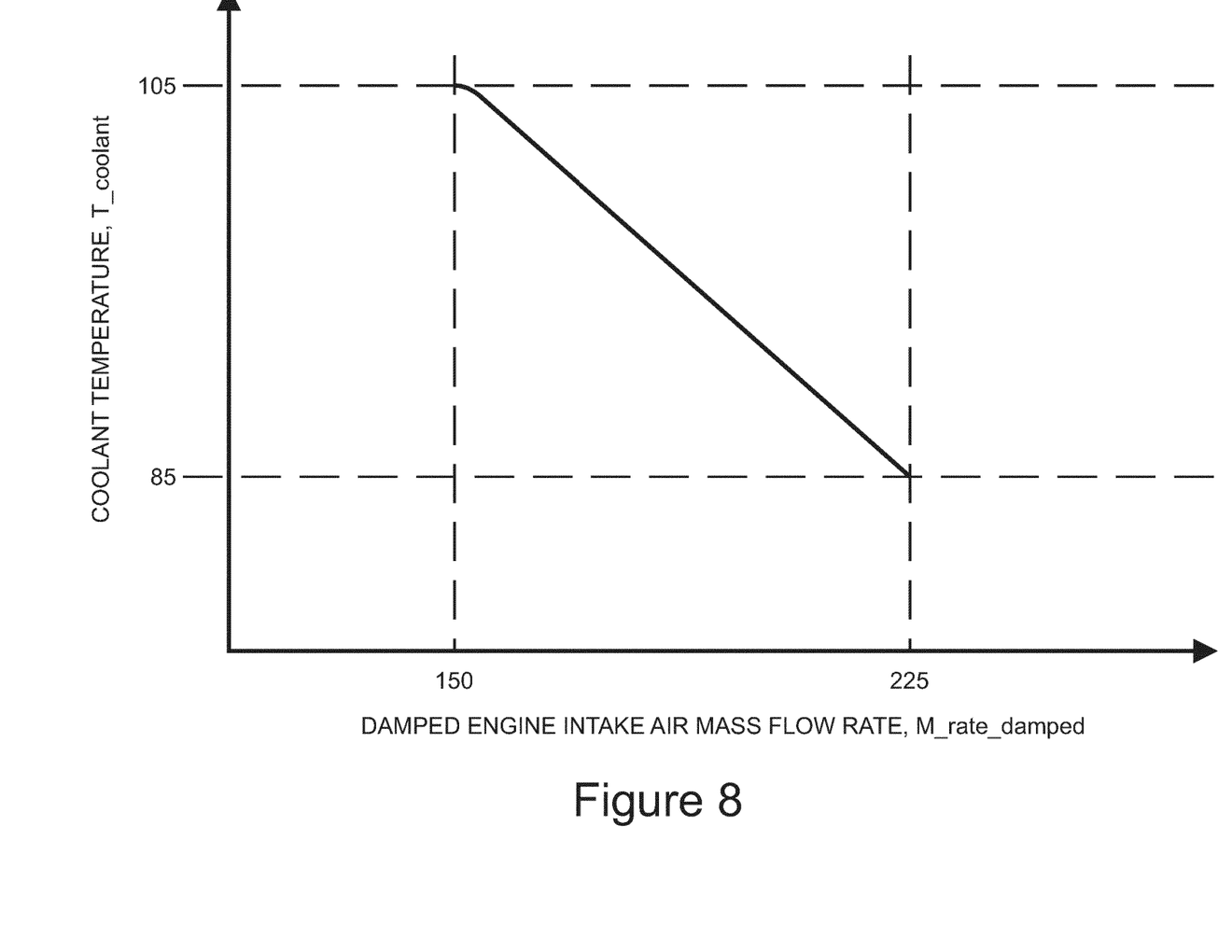
FIG. 8 is a plot of target cooling temperature as a function of engine intake air mass flow rate for a cooling system according to an embodiment of the invention.

FIG. 8 illustrates graphically the desired relationship between engine coolant temperature, $T\_coolant$ at the outlet conduit 110OUT and engine intake air mass flow rate, $M\_rate$ for a vehicle employing the controller 301C. It can be seen that for a value of $M\_rate$ of 150 kg per minute the desired engine operating temperature is 105 C whilst at a mass flow rate of 225 kg per minute the desired engine operating temperature is reduced to 85 C. It is to be understood that other values may be useful in some alternative embodiments.

The controller is configured to set the amount of power generated by the heating element 140AE according to the value of $M\_rate\_damped$ by controlling the duty cycle of the pulsed current output to signal line 301CL. A closed loop feedback arrangement is implemented in which the temperature of water flowing through engine outlet conduit 110OUT is measured, and the controller 301C arranged to adjust the duty cycle of the signal output along signal line 301CL to the heating element 140AE in order to cause the temperature of the coolant at the outlet conduit 110OUT to become substantially equal to the desired temperature determined from a lookup table according to the value of $M\_rate\_damped$. Thus, a value of desired temperature for a given value of $M\_rate\_damped$ may be obtained by reference to FIG. 8. Other arrangements may be useful in some embodiments.

In some embodiments the controller 301C of FIG. 6 may implement the above described methodology to control the heating element 140AE in dependence on M_rate_damped in addition to dependency on T_tx, knock_sens and T_amb.

In some embodiments, the value of one or more of T_tx, knock_sens and T_amb may be employed to adjust the value of desired coolant temperature (y-axis of FIG. 8) for a given value of M_rate_damped. In some embodiments, if the value of T_tx or knock_sens exceeds a predetermined value, the controller 301C is configured to ensure that the electrical signal that passes through the heating element 140AE has a minimum predetermined value of duty cycle so as to ensure adequate cooling of the coolant.

Embodiments of the present invention have the advantage that the temperature of operation of an engine 110 may be managed in such a manner as to extend the longevity of one or more components of a vehicle 100 such as the engine 110 and optionally a transmission 108 in addition by reducing the operating temperature of the engine 110 and optionally the transmission 108 relative to the operating temperature that would prevail in known cooling systems under certain conditions. These conditions may include conditions of high intake air mass flow rate in relatively high ambient temperature environments and/or low vehicle speeds in high ambient temperature conditions. In some embodiments, in addition, an amount of undesirable gases emitted by an engine may be reduced. For example, in some embodiments the temperature of operation of an engine in relatively low ambient temperature environments may be increased to a temperature at which a reduction in undesirable emissions and/or an increase in fuel efficiency occurs.

It is to be understood that a number of scenarios exist in which longevity of one or more components of a vehicle 100 that are cooled by the vehicle cooling system may be adversely affected by insufficient cooling of engine coolant. For example, if a vehicle 100 travels for extended periods at a relatively low speed in moderate ambient temperatures such as around 10 C, the transmission 108 may not enjoy sufficient cooling to maintain a desirable operating temperature thereof. Accordingly, some embodiments of the invention have the advantage that since transmission operating temperature T_tx may be taken into account by a controller 201C according to some embodiments of the invention when determining whether to lower the coolant temperature by triggering opening of the second inlet valve 140V2 at lower coolant temperatures, overheating of the transmission 108 may be prevented.

Similarly, in some known vehicles, when travelling at relatively high speeds such as around 150 kph or greater for extended periods in relatively cold ambient temperatures such as −10 C, the engine 110 may operate at a relatively high temperature due to the fact that coolant at the second coolant inlet 140IN2 is at a particularly low temperature as a result of cooling by the radiator. By taking engine intake air mass flow rate (M_rate or M_rate_damped) into account when determining when to open the second inlet valve 140V2, the operating temperature of the engine 110 may be decreased in such conditions, reducing a risk of excessive deterioration of an engine 110 due to operation at an excessively high temperature.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A controller in combination with a motor vehicle cooling system thermostatic valve assembly, the assembly comprising:
   a radiator bypass coolant flow inlet;
   a radiator coolant flow inlet;
   a coolant outlet;
   a heater; and
   a thermal actuator including a wax pellet type thermostatic pressure relief valve comprising a wax medium,
   the thermostatic pressure relief valve comprising a first valve provided in a flowpath of coolant from the radiator bypass coolant flow inlet to the coolant outlet and a second valve provided in a flowpath of coolant from the radiator coolant flow inlet to the coolant outlet,
      wherein the assembly is configured to allow flow of coolant from the radiator bypass coolant flow inlet to the coolant outlet and from the radiator coolant flow inlet to the coolant outlet,
      wherein the second valve is configured to control a flow rate of coolant from the radiator coolant flow inlet to the coolant outlet,
      wherein as pressure of coolant at the radiator bypass coolant flow inlet increases, the first valve opens to accommodate the flow rate,
      wherein the wax medium is provided in thermal communication with coolant flowing into the assembly from the radiator bypass coolant flow inlet and coolant flowing into the assembly from the radiator coolant flow inlet, and
      wherein under substantially static coolant conditions a temperature of the wax medium is determined at least in part by a temperature of coolant at the radiator bypass coolant flow inlet and a temperature of coolant at the radiator coolant flow inlet,
   the controller being configured to receive an ambient temperature signal indicative of an ambient air temperature, the controller being configured to control the flow rate of coolant from the radiator coolant flow inlet to the coolant outlet in dependence at least in part on the ambient temperature signal, the flow rate being controlled by causing opening of the second valve by causing the heater to heat the wax medium.

2. The controller according to claim 1, wherein the controller is configured to provide a predetermined amount of power to the heater in dependence at least in part on the ambient temperature signal.

3. The controller according to claim 2, wherein the controller is configured to receive at least one further signal selected from among a knock signal indicative of an amount of knock suffered by an associated engine, a transmission oil temperature signal indicative of a temperature of a transmission oil and a mass flow rate signal indicative of a mass flow rate of engine intake air, the controller being configured to cause a predetermined amount of power to be supplied to the heater in dependence at least in part on the at least one further signal.

4. The controller according to claim 3, wherein the controller is configured to receive the mass flow rate signal and an engine coolant temperature signal indicative of a temperature of coolant at an engine coolant outlet, the controller being configured to control the flow of coolant from the radiator coolant flow inlet to the coolant outlet of the assembly in order to attempt to maintain a predetermined relationship between the mass flow rate signal and the engine coolant temperature signal.

5. The controller according to claim 1, wherein the controller is configured to cause heating of the heater by controlling a duty cycle of an electrical signal supplied to the heater.

6. A controller according to claim 1, wherein under substantially static coolant conditions a relative contribution of coolant at the radiator coolant flow inlet to a temperature of the wax medium compared to a relative contribution of coolant at the radiator bypass coolant flow inlet is at least 10%.

7. A motor vehicle engine cooling system comprising a controller according to claim 1.

8. A method of controlling a motor vehicle cooling system thermostatic valve assembly having:
- a radiator bypass coolant flow inlet;
- a radiator coolant flow inlet;
- a coolant outlet;
- a heater; and
- a thermal actuator including a wax pellet type thermostatic pressure relief valve comprising a wax medium, the thermostatic pressure relief valve comprising a first valve provided in a flowpath of coolant from the radiator bypass coolant flow inlet to the coolant outlet and a second valve provided in a flowpath of coolant from the radiator coolant flow inlet to the coolant outlet, the method comprising:
- allowing flow of coolant from the radiator bypass coolant flow inlet to the coolant outlet and controlling a flow rate of coolant from the radiator coolant flow inlet to the coolant outlet, wherein as pressure of coolant at the radiator bypass coolant flow inlet increases, the first valve opens to accommodate the flow rate;
- providing the wax medium in thermal communication with coolant flowing into the assembly from the radiator bypass coolant flow inlet and coolant flowing into the assembly from the radiator coolant flow inlet;
- determining a temperature of the wax medium under substantially static coolant conditions at least in part by a temperature of coolant at the radiator bypass coolant flow inlet and a temperature of coolant at the radiator coolant flow inlet;
- receiving an ambient temperature signal indicative of an ambient air temperature; and,
- controlling the flow rate of coolant from the radiator coolant flow inlet to the coolant outlet in dependence at least in part on the ambient temperature signal, the flow rate being controlled by causing opening of the second valve by causing the heater to heat the wax medium.

9. A method according to claim 8, comprising providing a predetermined amount of power to the heater in dependence at least in part on the ambient temperature signal.

10. A method according to claim 9, comprising
- receiving at least one further signal selected from among a knock signal indicative of an amount of knock suffered by an associated engine, a transmission oil temperature signal indicative of a temperature of a transmission oil and a mass flow rate signal indicative of a mass flow rate of engine intake air; and
- causing a predetermined amount of power to be supplied to the heater in dependence at least in part on the at least one further signal.

11. A method according to claim 10, comprising
- receiving the mass flow rate signal and an engine coolant temperature signal indicative of a temperature of coolant at an engine coolant outlet; and
- controlling the flow of coolant from the radiator coolant flow inlet to the coolant outlet of the assembly in order to attempt to maintain a predetermined relationship between the mass flow rate signal and the engine coolant temperature signal.

12. A method according to claim 8, comprising causing heating of the heater by controlling a duty cycle of an electrical signal supplied to the heater.

13. A non-transitory storage medium carrying computer readable code for controlling a vehicle to carry out the method of claim 8.

14. A processor arranged to implement the method of claim 8.

* * * * *